(12) United States Patent
Hayashi

(10) Patent No.: US 7,356,149 B2
(45) Date of Patent: Apr. 8, 2008

(54) INFORMATION PROCESSING METHOD AND APPARATUS, COMPUTER PROGRAM, AND COMPUTER-READABLE STORAGE MEDIUM

(75) Inventor: Junichi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 784 days.

(21) Appl. No.: 10/686,579

(22) Filed: Oct. 17, 2003

(65) Prior Publication Data

US 2004/0081334 A1 Apr. 29, 2004

(30) Foreign Application Priority Data

Oct. 18, 2002 (JP) ............... 2002-304498

(51) Int. Cl.
*H04L 9/00* (2006.01)
*G06K 9/36* (2006.01)
*G06K 9/46* (2006.01)

(52) U.S. Cl. .................. 380/281; 380/43; 380/45; 382/235

(58) Field of Classification Search ................. 380/281
See application file for complete search history.

(56) References Cited

U.S. PATENT DOCUMENTS

| 4,754,482 | A | * | 6/1988 | Weiss ..................... 713/181 |
| 4,944,023 | A | * | 7/1990 | Imao et al. ................ 382/240 |
| 5,796,839 | A | * | 8/1998 | Ishiguro ..................... 380/44 |
| 6,535,616 | B1 | | 3/2003 | Hayashi et al. |
| 2001/0055390 | A1 | | 12/2001 | Hayashi et al. |
| 2002/0085722 | A1* | | 7/2002 | Asano et al. .............. 380/278 |
| 2002/0171743 | A1* | | 11/2002 | Kimizuka et al. ........ 348/222.1 |
| 2002/0172398 | A1 | | 11/2002 | Hayashi |
| 2002/0199106 | A1 | | 12/2002 | Hayashi |
| 2003/0059086 | A1 | | 3/2003 | Hayashi |
| 2003/0128863 | A1 | | 7/2003 | Hayashi |

FOREIGN PATENT DOCUMENTS

WO WO 2004/004198 A1 1/2004

OTHER PUBLICATIONS

JPEG 2000 Part 1 Final Committee Draft Version 1.0, ISO/IEC JTC1/SC29 WG1. p. 1-11. Mar. 16, 2000.*
Wee, Susie J., Apostolopaulos, John G. Secure Scalable Video Streaming for Wireless Networks. Streaming Media Systems Group. Hewlett-Packard Laboratories, Palo Alto, CA USA. May 2001.*
U.S. Appl. No. 10/465,615, filed Jun. 20, 2003, Junichi Hayashi.

* cited by examiner

*Primary Examiner*—Kim Vu
*Assistant Examiner*—Randal D Moran
(74) *Attorney, Agent, or Firm*—Fitzpatrick, Cella, Harper & Scinto

(57) ABSTRACT

An object of this invention is to eliminate the necessity to manage a plurality of keys even when image data having a plurality of tiles and layers is encrypted using different encryption keys for the respective tiles and layers. For this purpose, in this invention, a code stream c compression-coded for each tile is received. In repeatedly forming one tile group from a plurality of adjacent tiles and another tile group from adjacent tile groups to define the hierarchical structure of the tile groups, an encryption tile part designation section determines which tile group in which layer should be encrypted and outputs encryption tile information ta. A key matrix generation section (12) generates an encryption key ck for the whole of the received code stream c, sequentially generates the encryption key of each node in the hierarchical structure, and outputs the result as a key matrix ka. An encryption section (13) encrypts a tile to be encrypted by using the key generated for that tile and outputs an encrypted code stream c'.

8 Claims, 18 Drawing Sheets

FIG. 3A
31
LEVEL 3
FIG. 3B
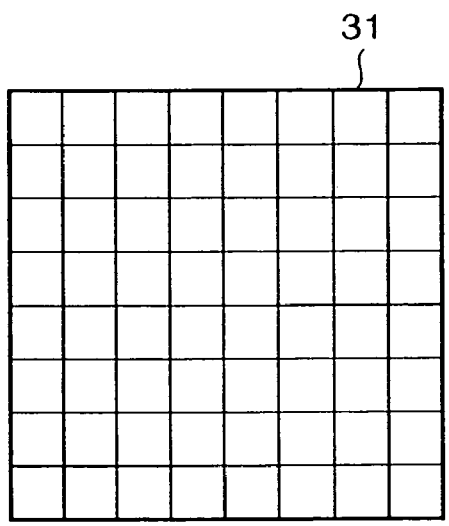
LEVEL 2
FIG. 3C
33
LEVEL 1
FIG. 3D
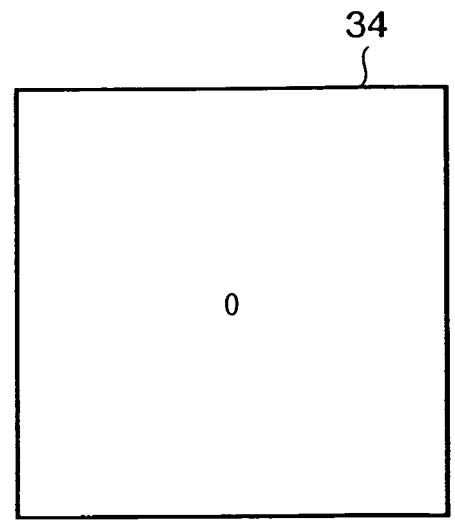
LEVEL 0

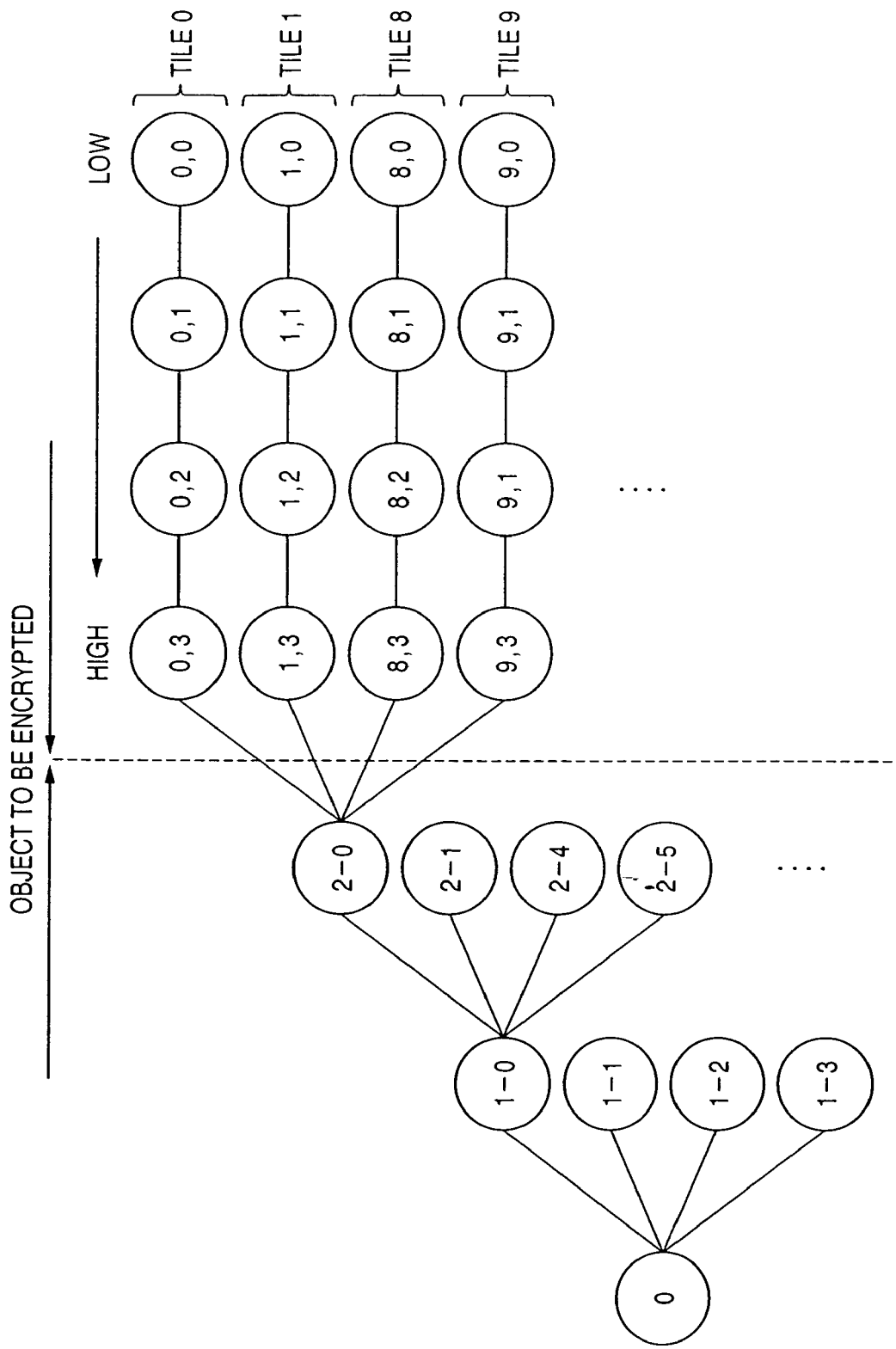

FIG. 5

| TILE INDEX | MINIMUM VALUE OF TILE PART INDEX TO BE ENCRYPTED |
|---|---|
| 0 | 0 |
| 1 | 2 |
| 3 | 3 |
| 4 | 1 |
| 5 | 0 |
| ⋮ | ⋮ |
| 62 | 3 |
| 63 | 1 |

FIG. 7

|    | 0 | 1 | 2 | 3 | 4 | 5 |
|----|---|---|---|---|---|---|
| 0  |   |   |   |   |   |   |
| 1  |   |   |   |   |   |   |
| 3  |   |   |   |   |   |   |
| 4  |   |   |   |   |   |   |
| 5  |   |   |   |   |   |   |
| :  |   |   |   |   |   |   |
| 62 |   |   |   |   |   |   |
| 63 |   |   |   |   |   |   |

FIG. 8

|    | 0 | 1 | 2 | 3 | 4 | 5 |
|----|---|---|---|---|---|---|
| 0  | 1 | 1 | 1 | 1 | 1 | 1 |
| 1  | 0 | 1 | 1 | 1 | 2 | 2 |
| 3  | 0 | 0 | 0 | 1 | 1 | 2 |
| 4  | 0 | 1 | 1 | 1 | 1 | 2 |
| 5  | 1 | 1 | 1 | 1 | 2 | 2 |
| :  | : | : | : | : | : | : |
| 62 | 0 | 0 | 0 | 1 | 1 | 2 |
| 63 | 0 | 1 | 1 | 1 | 2 | 2 |

FIG. 13

|    | 0 | 1 | 2 | 3 | 4 | 5 |
|----|---|---|---|---|---|---|
| 0  | 1 | 1 | 1 | 1 | 1 | 1 |
| 1  | 0 | 0 | 1 | 1 | 2 | 2 |
| 2  | 0 | 0 | 0 | 1 | 1 | 2 |
| 3  | 0 | 1 | 1 | 1 | 1 | 2 |
| 4  | 1 | 1 | 1 | 1 | 2 | 2 |
| ⋮  | ⋮ | ⋮ | ⋮ | ⋮ | ⋮ | ⋮ |
| 62 | 0 | 0 | 0 | 1 | 1 | 2 |
| 63 | 0 | 1 | 1 | 1 | 2 | 2 |

INFORMATION PROCESSING METHOD AND APPARATUS, COMPUTER PROGRAM, AND COMPUTER-READABLE STORAGE MEDIUM

FIELD OF THE INVENTION

The present invention relates to a technique for encrypting compression-coded data of digital image data.

BACKGROUND OF THE INVENTION

Conventionally, to securely transmit image data or the like, the entire image data is encrypted or scrambled. In this technique, whole image data is encrypted in advance by using an encryption key. Only a person who has a decryption key corresponding to the encryption key can correctly decrypt the image data.

However, for image data having a hierarchical structure, it is demanded that not the entire image data but the respective layers of the hierarchical structure be encrypted using different encryption keys for the purpose of controlling the reproduction of each layer of the image data. For image data constructed by a plurality of tiles, it is demanded that the respective tiles be encrypted using different encryption keys in order to control the reproduction of each tile. For a combination of image data of these types, i.e., when image data is constituted by a plurality of tiles, and each tile has a hierarchical structure, encryption processing is executed by using different encryption keys for the respective layers in the tiles aiming at controlling the reproduction of each tile and layer of the image data.

In this way, when the respective tiles and layers are encrypted using different encryption keys, the reproduction of image data can be controlled for each tile and layer.

However, to decrypt a predetermined tile or layer of encrypted image data, it is necessary to manage all encryption keys used for encryption processing and supply an appropriate decryption key for decryption processing.

When the respective tiles and layers are encrypted by using different encryption keys, the encrypted tiles and layers must be made to correspond to decryption keys to be used to decrypt them. This inevitably complicates key information management.

If the key information is not properly managed, it is impossible to correctly decrypt a tile or layer.

SUMMARY OF THE INVENTION

The present invention has been made in consideration of the above prior art, and has as its object to provide a technique which does not require to manage a plurality of keys even when image data having a plurality of tiles and layers is encrypted using different encryption keys for the respective tiles and layers.

In order to achieve the above object, an information processing method of the present invention comprises, e.g., the following steps.

An information processing method of receiving image data compression-coded for each tile and encrypting the image data is comprising:

repeatedly forming one tile group from a plurality of adjacent tiles and another tile group from adjacent tile groups so as to define a hierarchical structure of the tile groups;

generating encryption key information of an uppermost layer for an entire image expressed by encoded data;

executing, up to a tile located at a terminal, processing for generating encryption key information for a tile group or a tile located at a lower layer on the basis of encryption key information generated for a tile group located at an upper layer in the hierarchical structure;

when a designation input is given to define, as an object to be encrypted, a desired tile group of a desired layer in a tree structure of the tile groups, executing setting to encrypt a tile located at a terminal of a lower layer belonging to the tile group that is defined by the designation input; and executing encryption processing for each tile, which is set as an object to be encrypted, by using an encryption key generated for the tile and outputting the encrypted encoded data and encoded data of an unencrypted tile.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3A to 3D are views for explaining tile group formation according to the first embodiment;

FIG. 4A is a view showing the tree structure of tile parts and tile groups according to the first embodiment;

FIG. 5 is a view for explaining encryption tile part information according to the first embodiment;

FIG. 7 is a view showing the structure of a key matrix according to the first embodiment;

FIG. 8 is a view showing an example of an encryption tile part matrix according to the first embodiment;

FIG. 13 is a view showing an example of encryption tile part information according to the first embodiment;

DETAILED DESCRIPTION OF THE PREFERRED EMBODIMENTS

The embodiments of the present invention will be described below with reference to the accompanying drawings.

First Embodiment

The overall configuration of a system applied to the first embodiment will be described below with reference to FIG. 14.

Figure 14:
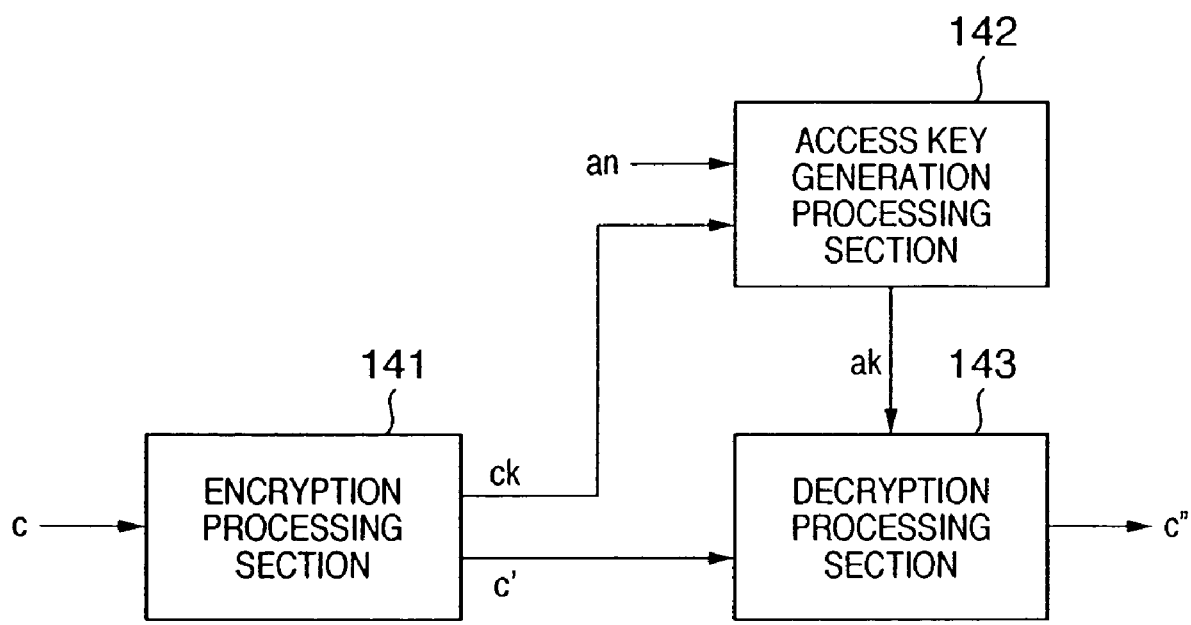
FIG. 14 is a block diagram showing the overall configuration of the system according to the first embodiment.

As shown in FIG. 14, the system according to this embodiment is constituted by an encryption processing section (or encryption apparatus) 141, an access key generation section (or access key generation apparatus) 142, and a decryption processing section (or decryption apparatus) 143.

A code stream c (the code stream c is the encoded data of image data; this will be described later in detail) is input to the encryption processing section. A content key ck and encrypted code stream c' are output from the code stream c. The access key generation section 142 receives the content key ck and an access level an and generates an access key ak. The decryption processing section 143 receives the access key ak and encrypted code stream c' and outputs a decrypted code stream c". When c'=c", the encrypted data is restored to the original image data before encryption.

In this embodiment, the decryption processing section 143 shall not access to the access key generation section 142. For example, the encryption processing section 141 is executed by an apparatus which encrypts an image photographed with a digital camera and uploads the image to a Web server or FTP server on the Internet. The access key generation section 142 is executed by a server which issues an access key. The decryption processing section 143 is executed by a network client which downloads encrypted image data.

Encryption Processing Section

The encryption processing section (function) applied to this embodiment will be described below with reference to FIG. 1.

Figure 1:
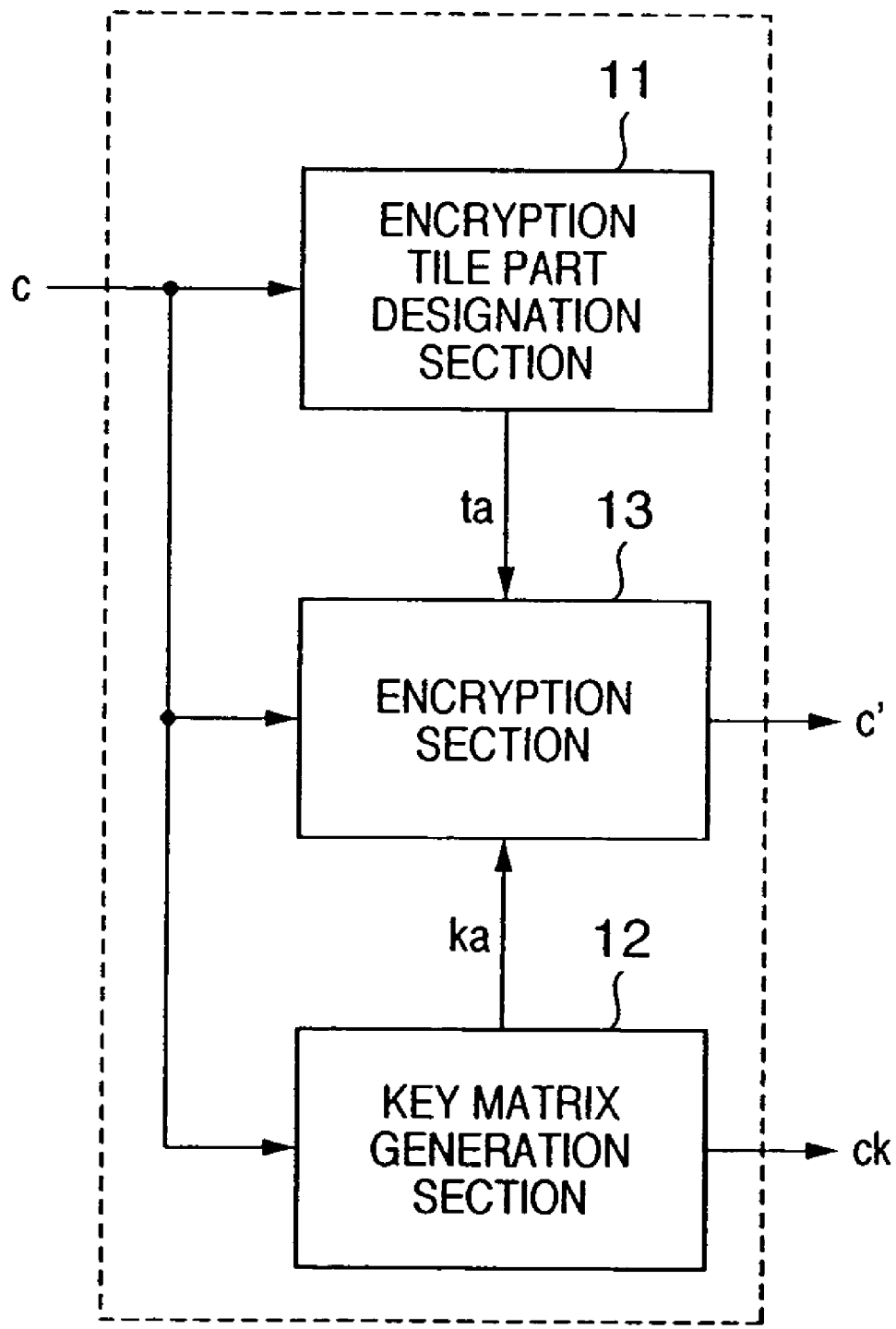
FIG. 1 is a block diagram of an encryption section according to the first embodiment.

As shown in FIG. 1, the encryption processing section according to this embodiment receives the code stream c. From the received code stream, the code stream key ck and the encrypted code stream c' that is obtained by encrypting the code stream c are generated. The generated code stream key ck and encrypted code stream c' are output.

The encryption processing section according to this embodiment comprises an encryption tile part designation section 11, key matrix generation section 12, and encryption section 13.

Encryption processing to be described below may be implemented by software processing. In this case, the above sections should be regarded as the concepts of functions necessary for the above processing operations.

The processing of the encryption tile part designation section 11 will be described first in detail. The code stream c is input to the encryption tile part designation section 11. Tile parts are extracted from the received code stream. The encryption tile part designation section 11 outputs encryption tile part information ta which designates a tile part to be encrypted in the extracted tile parts.

The code stream and tile part in this embodiment will be described. The code stream is a stream of codes obtained by compression-coding image data. In this embodiment, a stream of codes which are encoded by using a compression-coding method called JPEG2000 will be referred to as a code stream. JPEG2000 is standardized in ISO/IEC JTC1/SC29/WG1 15444-1.

In compression-coding by JPEG2000, an image is segmented into a plurality of rectangular regions. Each rectangular region is independently encoded by wavelet transform. This rectangular region is called a "tile". A code stream corresponding to an encoded tile can be segmented into at least one region called a tile part.

This will be described in more detail. As is well known, a component coefficient obtained by the first wavelet transform for one tile generates frequency component regions LL1, LH1, HL1, and HH1. Of these frequency component regions, {LH1+HL1+HH1} are handled as one part. The second wavelet transform is executed for LL1. Of LL2, LH2, HL2, and HH2 generated at this time, {LH2+HL2+HH2} are also handled as one part.

If another wavelet transform (third wavelet transform) is executed for LL2, {LH3+HL3+HH3} generated as a result are handled as a part. Remaining LL3 is handled as a single part. After that, quantization and entropy encoding are executed to encode the image data. A tile part indicates the encoding result of a set of frequency components which are generated every time wavelet transform is executed. This is because the code of one tile is constituted by the codes of a plurality of tile parts.

In JPEG2000, wavelet transform need not always be executed for all the tiles a predetermined number of times. In other words, the number of times of wavelet transform may change between the tiles.

A tile part in the following embodiments will be described on the basis of the above meaning. A description of parts except this will be made later.

Figure 2A:
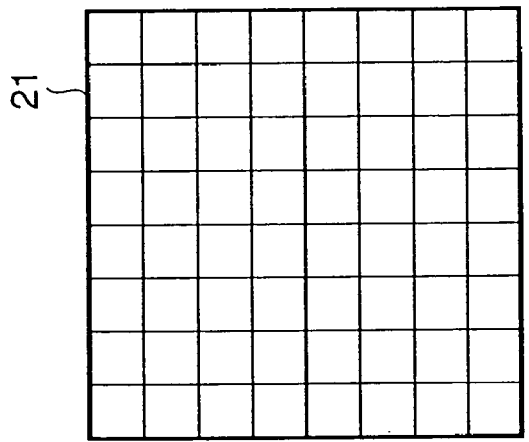
FIG. 2A is a view showing an example of tile segmentation according to the first embodiment.
Figure 2B:
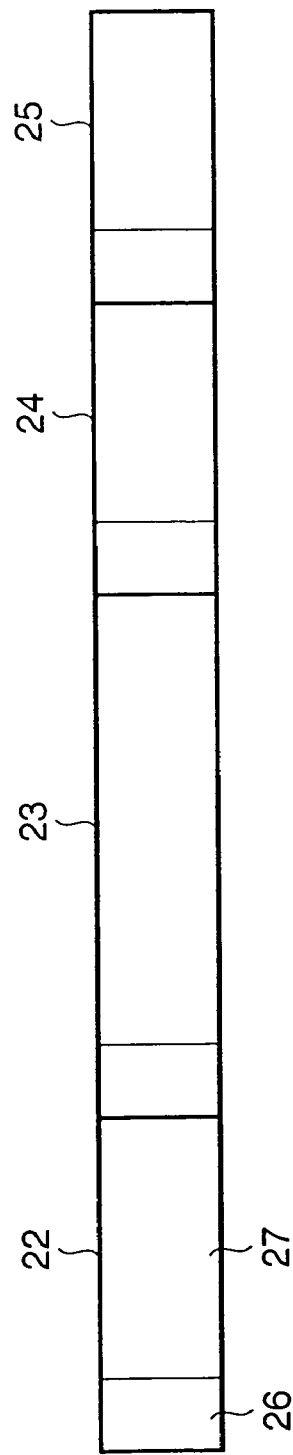
FIG. 2B is a view showing the data stream of one tile.

Detailed examples of a tile and tile part will be described with reference to FIGS. 2A and 2B. FIG. 2A shows an example in which an image is segmented into tiles. In an example 21, the entire image is segmented into 8×8=64 tiles. FIG. 2B shows an example of a code stream obtained by encoding one tile. In the example shown in FIG. 2B, one tile is constituted by four tile parts 22, 23, 24, and 25.

The tile part will be described. In JPEG2000, a tile can be segmented into a plurality of portions called tile parts. If the order of tile parts in all tiles is maintained, any tile part from another tile can be inserted between the tile parts. For example, when code stream is constituted in an order of tile part index 0 of tile index 0 tile part index 0 of tile index 1 tile part index 1 of tile index 0 tile part index 1 of tile index 1:

tile parts belonging to a plurality of tiles can be reproduced in parallel.

Each tile part is formed from a header field and data field. The header field is a region where various kinds of information necessary for expanding/decrypting the data field are stored. The header field is called a tile part header. Referring to FIG. 2B, the tile part 22 is constituted by a header field 26 and data field 27. This also applies to the remaining tile parts.

In JPEG2000, the code stream c can arrange data in accordance with a desired reproduction method so that various reproduction methods can be realized in accordance with the decompression amount of the code stream c. Such data arrangement is called a progression order. For example, the code stream c can be constructed by such a progression order that a low-resolution image is reproduced when the decompression amount is small, and the resolution of the reproduced image is increased as the decompression amount increases. Alternatively, the code stream c may be constructed by such a progression order that the image quality increases in accordance with the decompression amount.

In this embodiment, the code stream c is assumed to be compression-coded in advance by using a progression order and tile part corresponding to a desired method or degree of access control.

This will be described below by using an example. For example, assume that a predetermined tile should be access-controlled in accordance with three resolution levels (this example corresponds to a case wherein one tile is constituted by three tile parts and can be regarded that wavelet transform should be executed two times). In this case, the tile is compression-coded in advance by a progression order with priority on the resolution. In addition, the tile is segmented into three tile parts.

In this embodiment, it is assumed that the received code stream c is compression-coded in advance by using the progression order and tile part corresponding to the desired method or degree of access control. However, the present invention is not limited to this. More specifically, assume that the code stream c is not compression-coded in advance by using the progression order and tile part corresponding to the desired method or degree of access control. In this case, after the code stream c is received, it is compression-coded again by using the progression order and tile part corresponding to the desired method or degree of access control.

The tile group will be described next. In this embodiment, a plurality of tiles are put into a group. A group of tiles obtained by group formation is called a "tile group". In this embodiment, as an example of group formation, 2×2=4 tiles adjacent to each other are handled as one tile group. In addition, 2×2=4 tile groups are put into one tile group. In this way, group formation is repeated until the entire image is constituted by one tile group.

A detailed example of tile group formation will be described with reference to FIGS. 3A to 3D. Reference numeral 31 in FIG. 3A denotes an example in which an entire image is segmented into 64 tiles, like the example shown in FIG. 2A. Reference numeral 32 in FIG. 3B denotes an example in which four adjacent tiles in the example 31 are put into a group so that the entire image is expressed by 16 tile groups. Reference numeral 33 in FIG. 3C denotes an example in which four adjacent tile groups in the example 32 are put into a group so that the entire image is expressed by four tile groups. Reference numeral 34 in FIG. 3D denotes an example in which four adjacent tile groups in the example 33 are put into a group so that the entire image is expressed by one tile group.

A detailed example of the structures of the above-described tile, tile part, and tile group will be described with reference to FIG. 4A.

FIG. 4A shows an example of the structure of tile groups, tiles, and tile parts when the entire image is segmented into 64 tiles. As shown in FIG. 4A, the tile groups and tile parts in this embodiment can be expressed by a tree structure in which the entire image is represented by the root node. Each node corresponds to a tile group or tile part.

Referring to FIG. 4A, the root node indicates the entire image (34 in FIG. 3D). The root node (level 0) is constituted by tile groups (33 in FIG. 3C) corresponding to four child nodes that belong to level 1. A level is an index that indicates a layer in the hierarchy of the tree structure. The root node is defined as level 0. The level increases from the parent to child in the tree structure.

In other words, each node belonging to level 1 is constituted by tile groups (32 in FIG. 3B) corresponding to four child nodes that belong to level 2. Each of the four nodes belonging to level 2 is constituted by tiles (31 in FIG. 3A) corresponding to four child nodes that belongs to level 3. From level 4, each node is constituted by only a tile part corresponding to one child node that belongs to the immediately succeeding level.

Note that in the tree structure from level 4, a large tile part index corresponds to a parent node, and a tree structure is formed in descending order of tile part indices (a tile part whose tile part index is 0 corresponds to the lowest frequency component region).

As described above, the tile groups and tile parts according to this embodiment can be expressed by a tree structure.

In addition, the tiles, tile parts, and tile groups are assigned indices capable of specifying them.

Tiles are assigned tile indices sequentially from the tile located at the upper left of the image in accordance with the raster order so that the first tile is assigned tile index "0".

Tile parts are assigned tile part indices in the order of code stream decoding in each tile so that the first tile part is assigned tile part index "0". In this embodiment, JPEG2000 is used as an example. Tile part index "0" indicates the lowest frequency component region. The tile part index becomes large as the frequency becomes high.

Tile groups are assigned indices sequentially from the tile or tile group located at the upper left of the image in accordance with the raster order in each tile group or tile of lower level so that the first tile or tile group is assigned index "0". Each assigned index is connected to the index of the parent such that a tile group index is assigned. That is, a tile or tile group that is more indispensable for decompression is assigned a smaller tile part index.

In the following description, tile group indices are assigned in the above-described manner. However, the present invention is not limited to this, and various tile group index assigning methods can be used. For example, the group index of a child node may be connected to the tile group index of the parent of each node. The child nodes are assigned indices in the raster order in each parent tile group so that the first child node is assigned "0".

According to this assigning method, a tile group indicated by "1-0" in FIG. 4A can be expressed by tile index "0-0". Similarly, "2-1" can be expressed by "0-0-1".

Figure 4B:
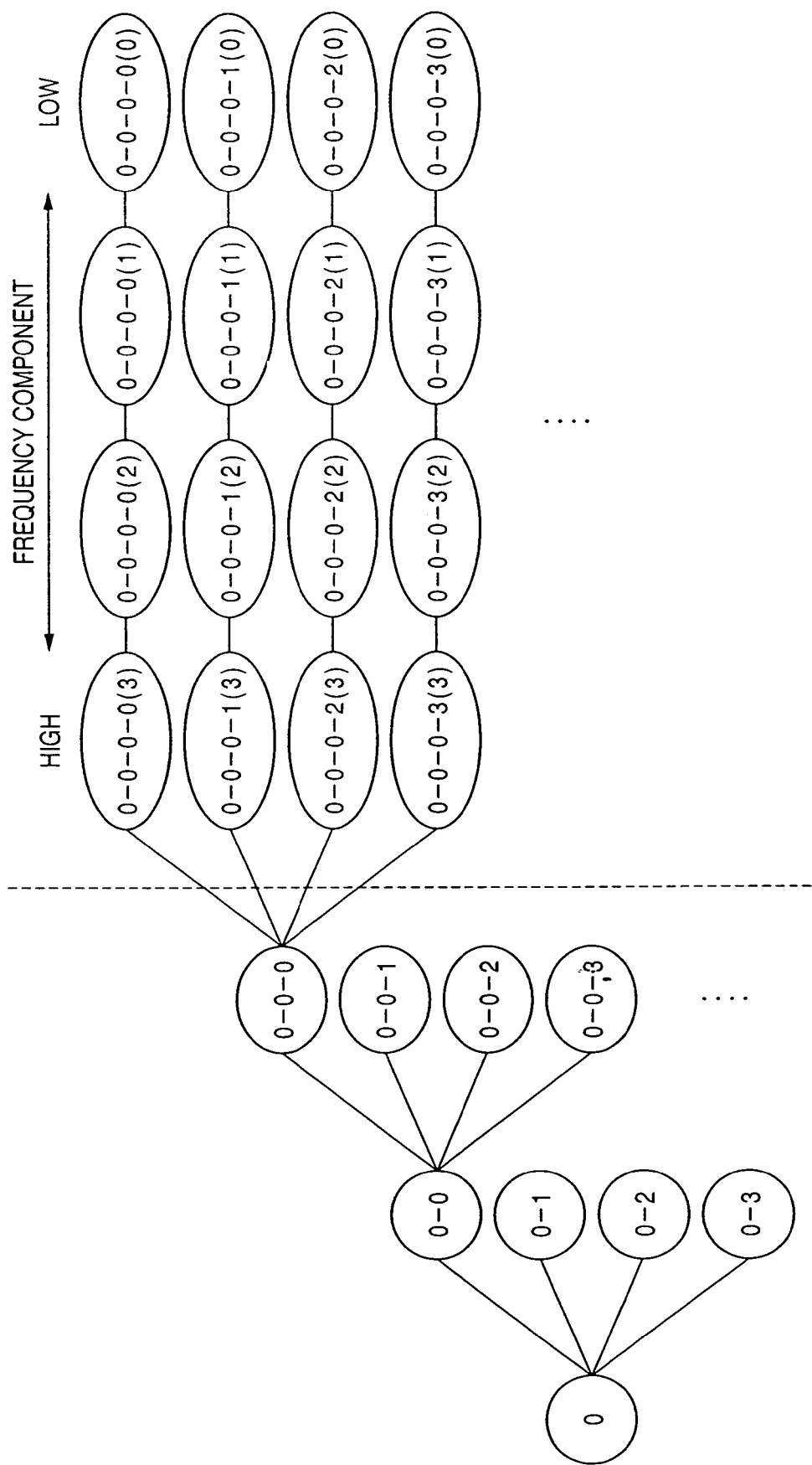
FIG. 4B is a view showing a tree structure that indicates the tree structure shown in FIG. 4A by using tile indices and tile part indices.

FIG. 4B shows a tree structure that is equivalent to that shown in FIG. 4A, which is indicated using tile indices and tile part indices. Referring to FIG. 4B, for example, "0-0-0-3" in "0-0-0-0(3)" is a tile index, as described above. The last number "(3)" is a tile part index. A small tile part index indicates that the data should preferentially be decrypted, i.e., the data is the encoded data of a low frequency component.

The code stream, the structure of tile group/tile/tile part, and the tile group index/tile index/tile part index have been described above.

The encryption tile part designation section 11 of this embodiment reads out information that belongs to the main header field and tile part field of the received code stream c and interprets the structure of the tiles, tile parts, and tile groups. The encryption tile part designation section 11 designates tile groups, tiles, and tile parts to be encrypted and outputs the encryption tile part information ta.

The tile groups, tiles, and tile parts to be encrypted may be explicitly designated by the user. Alternatively, information stored in advance in an RAM or HD may be used.

When the user should do designation, a result obtained by interpreting the code stream c is presented to the user as, e.g., a tree structure as shown in FIG. 4B by using a monitor or the like. The user designates a node corresponding to a desired tile group or tile part. Tile groups or tile parts which are present between the designated position and the position indicated by the broken line in FIG. 4B are also determined as objects to be encrypted.

For example, assume that "0-0-0-0(2)" in FIG. 4B is designated. In this case, "0-0-0-0(2)" and "0-0-0-0(3)" of upper level are determined as objects to be encrypted. However, tiles "0-0-0-0(1)" to "0-0-0-3(0)" are not objects to be encrypted. This means that these tiles can be decrypted and reproduced without any decryption key.

Assume that the tile group "0-0" is designated. In this case, the tile groups on the side of broken line, i.e., tile groups "0-0-0", "0-0-1", "0-0-2", and "0-0-3" of lower level are determined as objects to be encrypted. The tile group "0-0-0" is defined as a tile group of interest. This tile group includes tiles "0-0-0-0" to "0-0-0-3". These tiles are also determined as objects to the encrypted. As a result, all tile parts of each tile area also determined as objects to be encrypted. That is, when one tile group is designated, tile groups of lower level, which are included in the tile group, and finally, all tile parts of each tile of lower level are determined as objects to be encrypted.

This means that, for example, when access control is executed in accordance with the resolution, a user who has an access right to a high resolution automatically has an access right to a low resolution. In addition, when a tile group is designated, all the tiles and tile parts belonging to the tile group are designated as objects to be encrypted.

Tiles or tile parts to be encrypted are determined in the above-described way. The tile parts designated as objects to be encrypted are output as the encryption tile part information ta. The encryption tile part information ta contains sets of a tile index and the minimum value of the indices of tile parts to be encrypted in the tile parts belonging to the tile.

FIG. 5 shows an example of the encryption tile part information ta for a code stream of an image which is formed from 64 tiles. As shown in FIG. 5, for, e.g., the tile with tile index 0, the minimum value of the tile part to be encrypted is 0. This means that all the tile parts belonging to this tile are to be encrypted. On the other hand, for the tile with tile index 1, the minimum value of the tile part to be encrypted is 2. This means that of the tile parts belonging to this tile, tile parts with tile part indices 0 and 1 need not be encrypted while tile parts whose tile indices are 2 or more are to be encrypted.

When the user determines the object to be encrypted (determines the encryption tile part information ta), a specific tile or tile part to be encrypted may be designated. However, it is preferable to designate the limit of the highest resolution that is reproducible without any encryption key (or lowest resolution that is reproducible with an encryption key). To set tile groups or tile parts arrayed in the vertical direction at once in the window shown in FIG. 4B, preferably, a vertical line is displayed, and its display position is horizontally moved using a pointing device to determine the objects to be encrypted. However, a case wherein the user individually designates the objects to be encrypted will be described here.

As described above, the encryption tile part information ta is output from the encryption tile part designation section 11 and input to the encryption section 13.

The processing of the key matrix generation section 12 will be described next in detail. The key matrix generation section 12 receives the code stream c, generates a key matrix ka from the received code stream c, and outputs the generated key matrix ka and code stream key ck.

Figure 6:
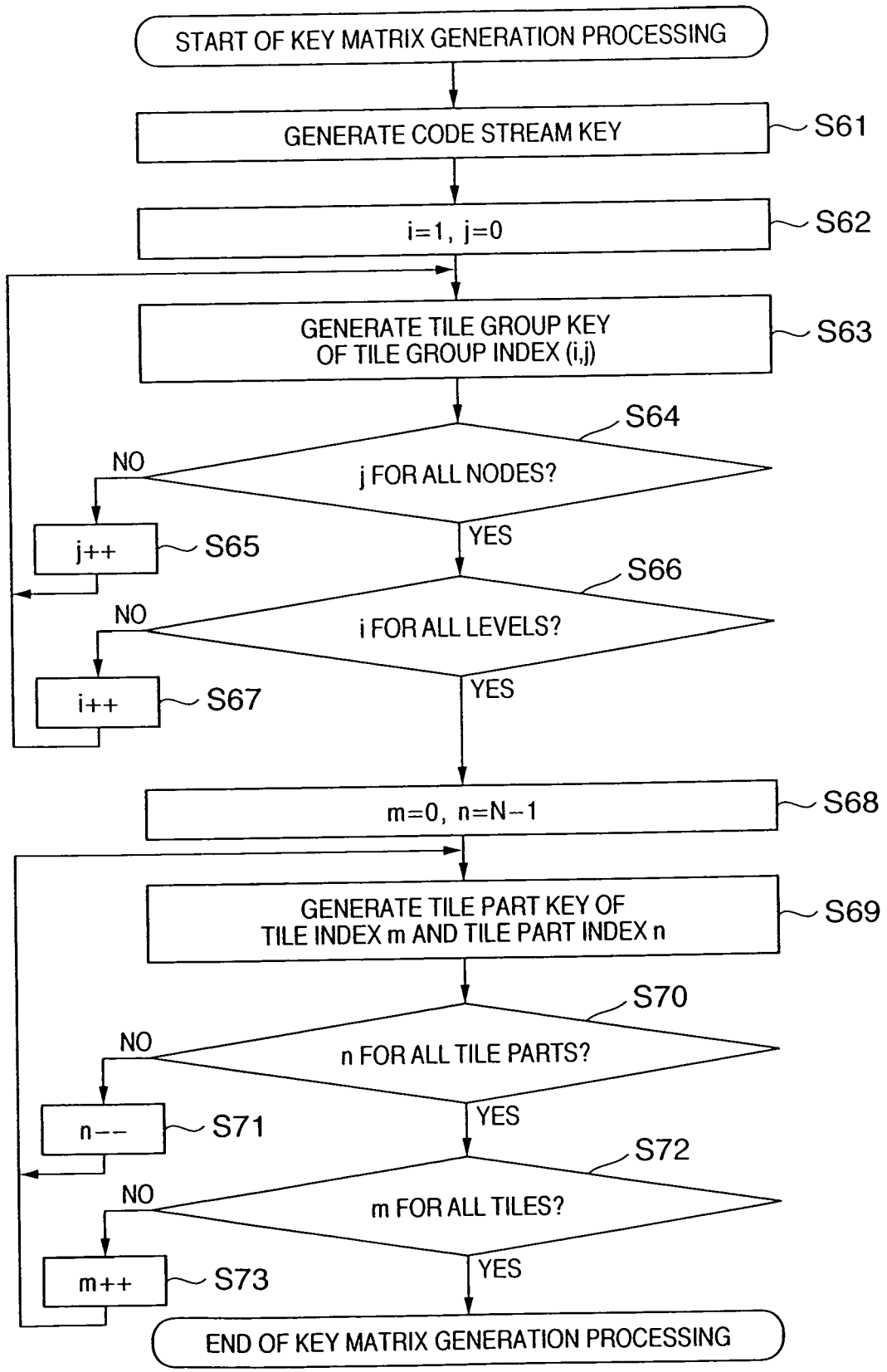
FIG. 6 is a flow chart of key matrix generation processing according to the first embodiment.

The key matrix generation processing executed by the key matrix generation section 12 will be described here in detail with reference to FIG. 6. FIG. 6 is a flow chart showing the key matrix generation processing executed by the key matrix generation section 12.

First, in step S61, the code stream key ck is generated. The code stream key ck is calculated as the hash value of the code stream c by $$ck = K(0) = H(c) \quad (1)$$

where H( ) is a function having a one-way direction (lossy) and collision resistance. For example, a hash function or encryption processing such as DES can be applied. The code stream key ck is a value corresponding to the root node of the tree structure shown in FIG. 4A. The code stream key ck is generated on the basis of the input data of one image. The present invention is not limited to Equation (1) of this embodiment. It is only necessary to change the code stream key ck for each code stream. For example, a random number that changes for each code stream c may be generated, and the random number may be used as the code stream key ck.

Next, in step S62, a parameter i is initialized to "1". A parameter j is initialized to "0". The parameter i is an index that indicates a level in the above-described tree structure. The parameter j is an index representing a node at each level described above. Especially, a combination of i and j (i,j) is called a tile group index.

In step S63, a tile group key for the tile group index (i,j) is generated. The tile group key is calculated as the hash value of the tile group key of the parent and the tile group index (i,j) by $$K(i,j) = H(K(i-1,k),1,j) \quad (2)$$

where k is an index that indicates a node corresponding to the parent node of the tile group (i,j). More specifically, the tile group key is generated from the tile group key $K(i-1,k)$ corresponding to the parent node and the tile group index (i,j) of the node corresponding to the tile group key to be generated. However, the present invention is not limited to this. The tile group key may be generated from a key corresponding to the parent node and the tile index contained in the node corresponding to the tile group key to be generated. For example, the tree is traced sequentially from the node corresponding to the tile group to be generated, the node corresponding to the tile is checked, and the tile index of the tile is used. In short, the key of a node of low level is derived on the basis of the key ck corresponding to the node of upper level (the node on the root node side) and the index of a node on the side of low level (lower layer). This processing is repeated.

In step S64, it is determined whether tile group keys corresponding to all nodes at level i are generated. If YES in step S64, the flow advances to step S66. If NO in step S64, the flow advances to step S65.

In step S65, the parameter j is incremented by one. Then, step S63 is executed again. That is, keys are generated for all tile groups belonging to the level indicated by the parameter i.

On the other hand, if the tile group keys for the level indicated by the parameter i are generated, the processing advances to step S66. The parameter j is initialized, and it is determined whether all levels are processed. If YES in step S66, the flow advances to step S68. If NO in step S66, the flow advances to step S67. The parameter i is incremented by one to process the next level, and the processing from step S63 is repeated.

The processing advances to step S68 when keys are generated not for the nodes at the terminal, i.e., tile groups but for the individual tiles.

In step S68, a parameter m is initialized to "0", and a parameter n is initialized to "N−1". A parameter N indicates the total number of tile parts that constitute the tile m.

In step S69, a tile part key corresponding to the tile index m and tile part index n is generated. The tile part key is calculated as the hash value of the tile part key of the parent by $$K(m,n+1)=H(K(m,n)) \quad (3)$$

Figure 7:
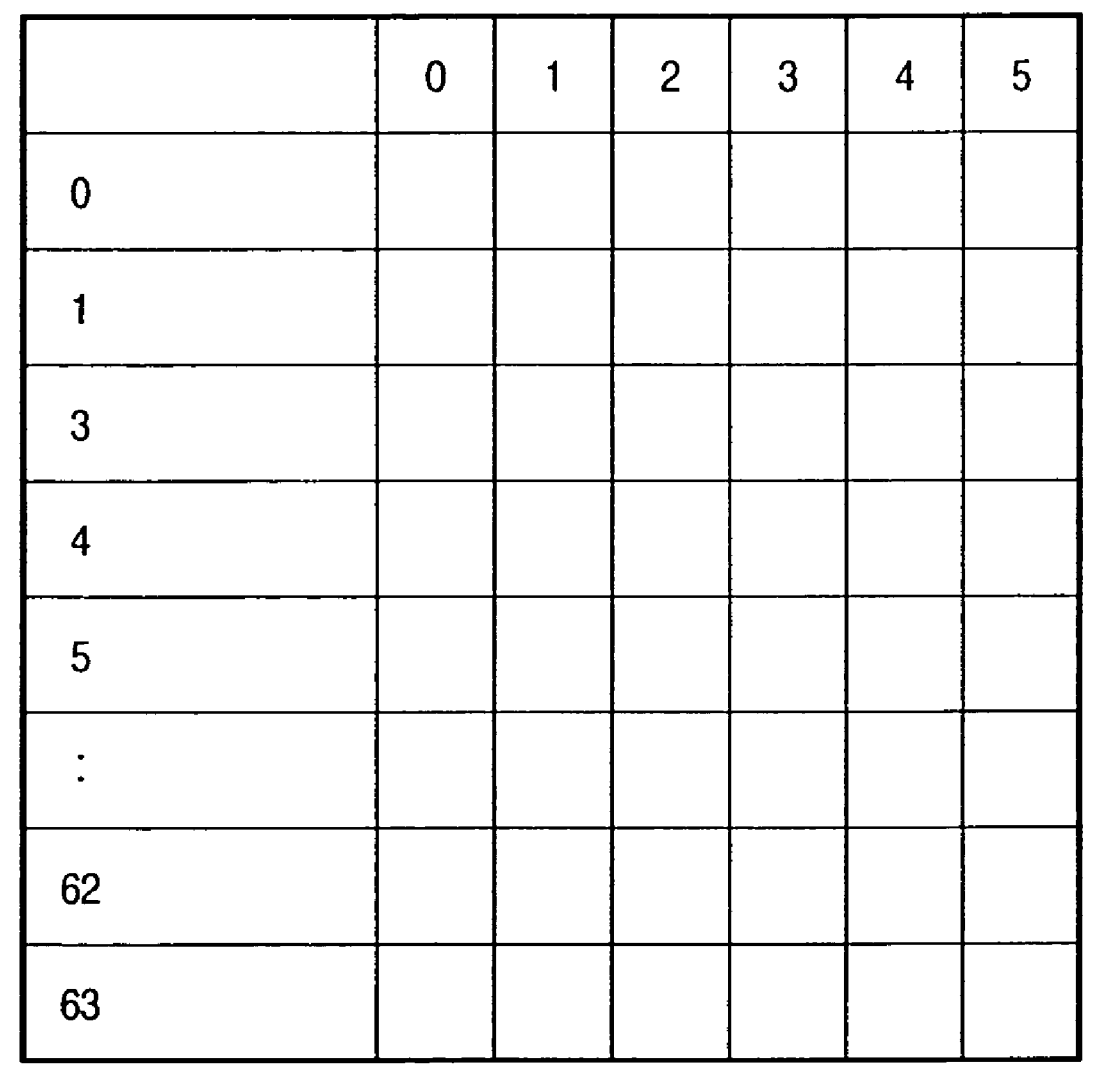

The generated tile part key is recorded as the key matrix ka. An example of the key matrix ka will be described with reference to FIG. 7. FIG. 7 shows an example of the key matrix ka that can be applied to this embodiment. The key for a tile part having the largest index in a given tile part is generated on the basis of a key (the key generated in step S63) generated for the tile to which the tile part belongs. The key for each tile part having a smaller index is derived using a key given to the tile part that has an index larger by one.

FIG. 7 shows an example of the key matrix ka when the entire image is formed from 64 tiles, and the maximum number of tile parts is 5. As shown in FIG. 7, each row of the key matrix ka corresponds to a tile. Each column corresponds to a tile part. As the element value of the matrix, the tile part key which is calculated in step S68 is recorded. For an element having no tile part, NULL or the like is recorded.

Next to step S69, step S70 is processed. In step S70, it is determined whether tile part keys corresponding to all nodes belonging to the tile part index n are generated. If YES in step S70, the flow advances to step S72. If NO in step S70, the flow advances to step S71 to decrement the parameter n by "1". Then, the processing in step S69 is executed.

When the processing for all tile parts indicated by the tile index m is ended, the flow advances to step S72. The variable n is initialized, and it is determined whether all tiles are processed. If YES in step S72, the key matrix generation processing is ended. If NO in step S72, the flow advances to step S73 to increment the parameter m by "1" to execute processing for the next tile. The processing from step S69 is repeated.

As described above, the key matrix ka is generated by the key matrix generation processing. The generated key matrix ka is input to the encryption section 13.

The processing of the encryption section 13 will be described next in detail. The encryption section 13 receives the code stream c, encryption tile part information ta, and key matrix ka, encrypts each part of the code stream c indicated by the encryption tile part information ta by using the tile part key recorded in the key matrix ka, and outputs the encrypted code stream c'. This processing will be described below in detail.

First, on the basis of the encryption tile part information ta from the encryption tile part designation section 11, the encryption section 13 generates an encryption tile part matrix to determine whether each tile part is a tile part to be actually encrypted. FIG. 8 shows an example of the encryption tile part matrix. In the matrix shown in FIG. 8, each row represents a tile, and each column represents a tile part. As for an element value, a tile part which should not be encrypted is indicated by "0", a tile part to be encrypted is indicated by "1", and a tile part that is not present is indicated by "2". The value "2" is stored for the purpose of coping with a case wherein the number of times of wavelet transform changes between the tiles, i.e., the number of tile parts in each tile changes. FIG. 8 indicates that the maximum number of times of wavelet transform is 5 ((number of times of wavelet transform)+1 equals the number of tile parts, as already described above).

In the encryption tile part information ta, the minimum value of the tile part indices encrypted in each tile is recorded. In this embodiment, tile parts in each index, which have values larger than the tile part index recorded in the encryption tile part information ta, should be encrypted. Hence, the tile parts to be encrypted are specified from the encryption tile part information ta, as shown in FIG. 8.

Next, the encryption tile part matrix is compared with the key matrix ka. For a tile part having an element value "1" in the encryption tile part matrix, the tile part in the code stream c is encrypted by using the key located at the same coordinates in the key matrix ka (a tile part having an element value "0" in the encryption tile part matrix is not encrypted). In this way, all tile parts to be encrypted are encrypted. The data of corresponding tile parts in the code stream c are replaced with the data of the encrypted tile parts and output.

For each encrypted tile part, information Inf representing that the tile part is encrypted is recorded in the tile part header. This information Inf is used to determine in decryption processing (to be described later) whether the tile part is encrypted.

In JPEG2000, the code stream c that constitutes the tile part is formed from units called packets. Each packet comprises a header field and a data field. In this embodiment, the header field is not encrypted. Only the data field is encrypted. With this encryption method, even when an image is encrypted, it can correctly be expanded as an image.

In this embodiment, the encryption method is not particularly limited. Various encryption algorithms such as DES (Data Encryption Standard) or AES (Advanced Encryption Standard) can be applied.

The code stream in which all tile parts indicated by the encryption tile part matrix are encrypted in the above way is output as the encrypted code stream c'. The encryption processing section 141 shown in FIG. 14 has been described above.

As can easily be imagined, the encryption processing section 141 in this embodiment can generally be implemented by an information processing apparatus such as a personal computer. The above function can be implemented by an information processing apparatus such as a personal computer. Hence, the characteristic features of this embodiment also apply to a computer program or a computer-readable storage medium such as a CD-ROM that stores the computer program.

Access Key Generation Processing Section

The access key generation section (function) applied to this embodiment will be described next with reference to FIG. 9.

Figure 9:
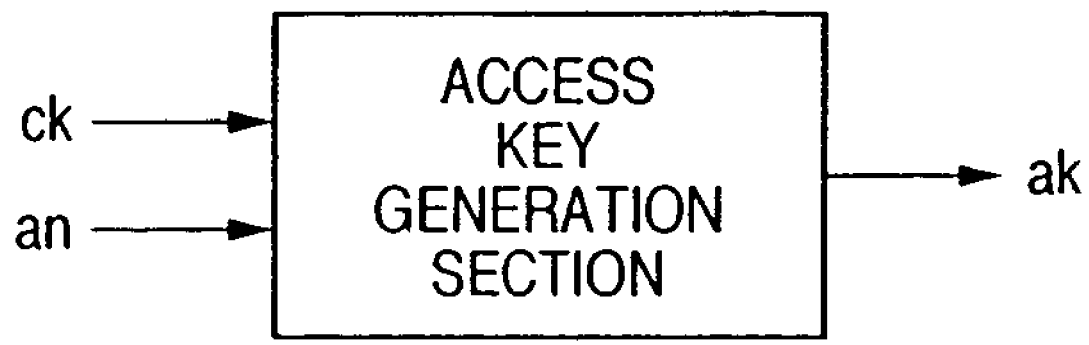
FIG. 9 is a block diagram of an access key generation section according to the first embodiment.

As shown in FIG. 9, the access key generation section receives the code stream key ck and the access permission index an. From the received code stream key ck, the access key generation section generates the access key ak (a key for decryption) corresponding to the access permission index an and outputs the generated access key ak. The access permission index an is an access permission tile group index or a tile and tile part index.

As shown in FIG. 4, in this embodiment, the tile groups and tile parts can be expressed by a tree structure. Of the nodes that forms the tree structure shown in FIG. 4, one node is designated by the access permission index an. An access key corresponding to the designated node is generated.

As a method of generating the access key for the designated node, the received code stream key ck is made to correspond to the root node. Keys corresponding to the respective nodes are sequentially generated by the method shown in FIG. 6. This processing is repeated until the index of the node reaches the access permission index an.

Figure 10:
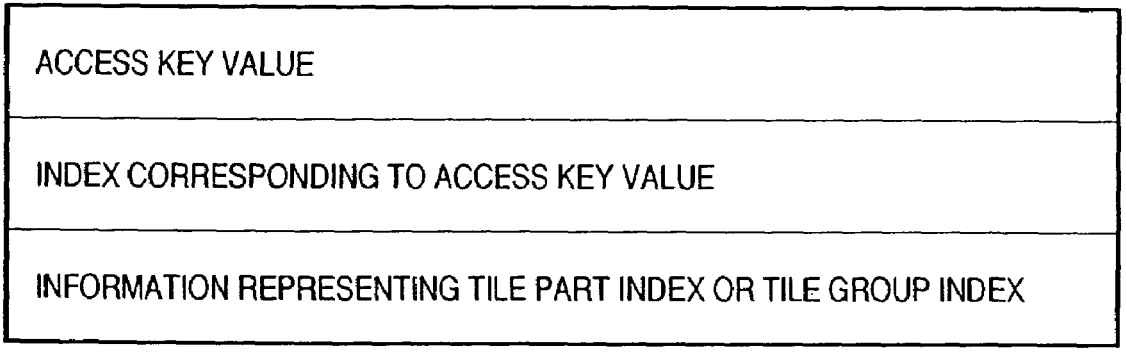
FIG. 10 is a view showing the format of an access key according to the first embodiment.

The generated access key is output as ak according to the format shown in FIG. 10. As shown in FIG. 10, ak is constituted by an access key, the index of a tile group or tile part corresponding to the access key, and information representing whether the index is a tile part index or tile group index. The access key ak is stored in the format shown in FIG. 10 and then transferred to the decryption processing section (to be described later) (actually, the access key ak is provided in response to a request from the decryption processing section). The output access key may be encrypted and recorded in ak such that the access key can be securely transmitted to the decryption processing section.

The access key generation processing by the access key generation section will be described using an example.

For example, assume that the tile group index "0-0-0" (FIG. 4B) is designated as the access permission index an. From the received code stream key ck (corresponding to the root node), a tile group key corresponding to the tile group index "0-0" is generated by using a hash function. From the generated tile group key of the tile group "0-0", the tile group key of the tile group "0-0-0" is generated and output as the access key ak (FIG. 10) of the tile group "0-0-0".

Decryption Processing Section

The operations of the decryption processing section 143 and access key generation section 142 of this embodiment will be briefly described first. Then, the processing contents of the decryption processing section 143 will be described in detail. To help understand these contents, the description will be made assuming that a PC that is held by a general user and can be connected to the Internet serves as the decryption processing section 143, and an authentication server for decryption serves as the access key generation section 142.

Upon receiving the encrypted code stream c', the decryption processing section (client PC) 143 reproduces the image on the basis of the encoded data of non-encrypted tile parts. Hence, the reproducible resolution of the image is limited, as a matter of course. If the user of the decryption processing section wants to reproduce a higher resolution, a node of the required level is determined in accordance with the instruction from the user by tracing the tree upward from the encrypted tile part. The access key generation section 142 (authentication server) is requested of the level of the node (tile group index or tile part index) as the index an. As a result, the access key ak corresponding to the requested node is sent from the access key generation section 142. On the basis of the received access key ak, a key group that is used to decrypt the encrypted tile parts of lower levels are generated. The encoded data are decrypted using the keys. Decryption is thus executed.

When a request for acquisition of the access key ak is received from the client (corresponding to the decryption processing section), the access key generation section 142 should execute authentication processing, charging processing, and the like and then provide the access key. Hence, when the access key generation section 142 is installed on the Internet as an authentication server, it must be installed assuming that there are a plurality of encryption processing sections and a plurality of decryption processing sections.

Accordingly, code stream keys corresponding to individual images must be registered together with pieces of information that specify a number of images. The decryption processing section 143 sends information that specifies an image and a node index for decryption, thereby acquiring the access key ak of the desired node level of the desired image. The access key generation section 142 (authentication server) only needs to store, for one image, information (an ID or file name) that specifies the image and one code stream corresponding to the root node of the image. Hence, the amount of information to be stored can be decreased.

On the basis of the above assumption, the decryption processing section (function) applied to this embodiment will be described below with reference to FIG. 11.

Figure 11:
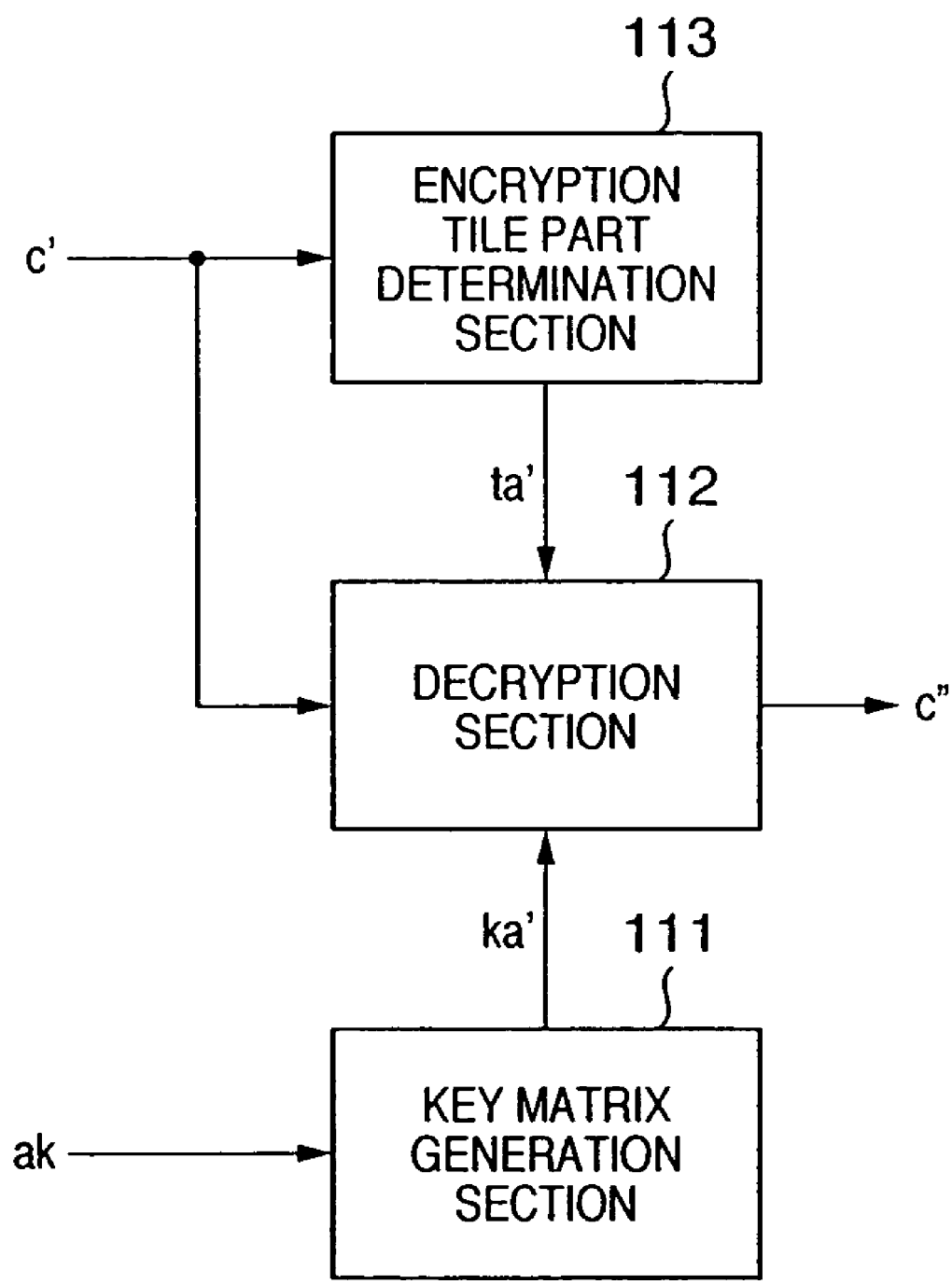
FIG. 11 is a block diagram of a decryption processing section according to the first embodiment.

As shown in FIG. 11, the decryption processing section of this embodiment comprises a key matrix generation section 111, a decryption section 112, and an encryption tile part determination section 113.

The processing of the key matrix generation section 111 will be described first in detail. The key matrix generation section 111 receives the access key ak corresponding to the tile group index or tile part index requested of the access key generation section 142. From the received access key ak, the key matrix generation section 111 generates a key matrix ka' (decryption keys each corresponding to a node (tile or tile part)) and outputs the generated key matrix ka'.

Figure 12:
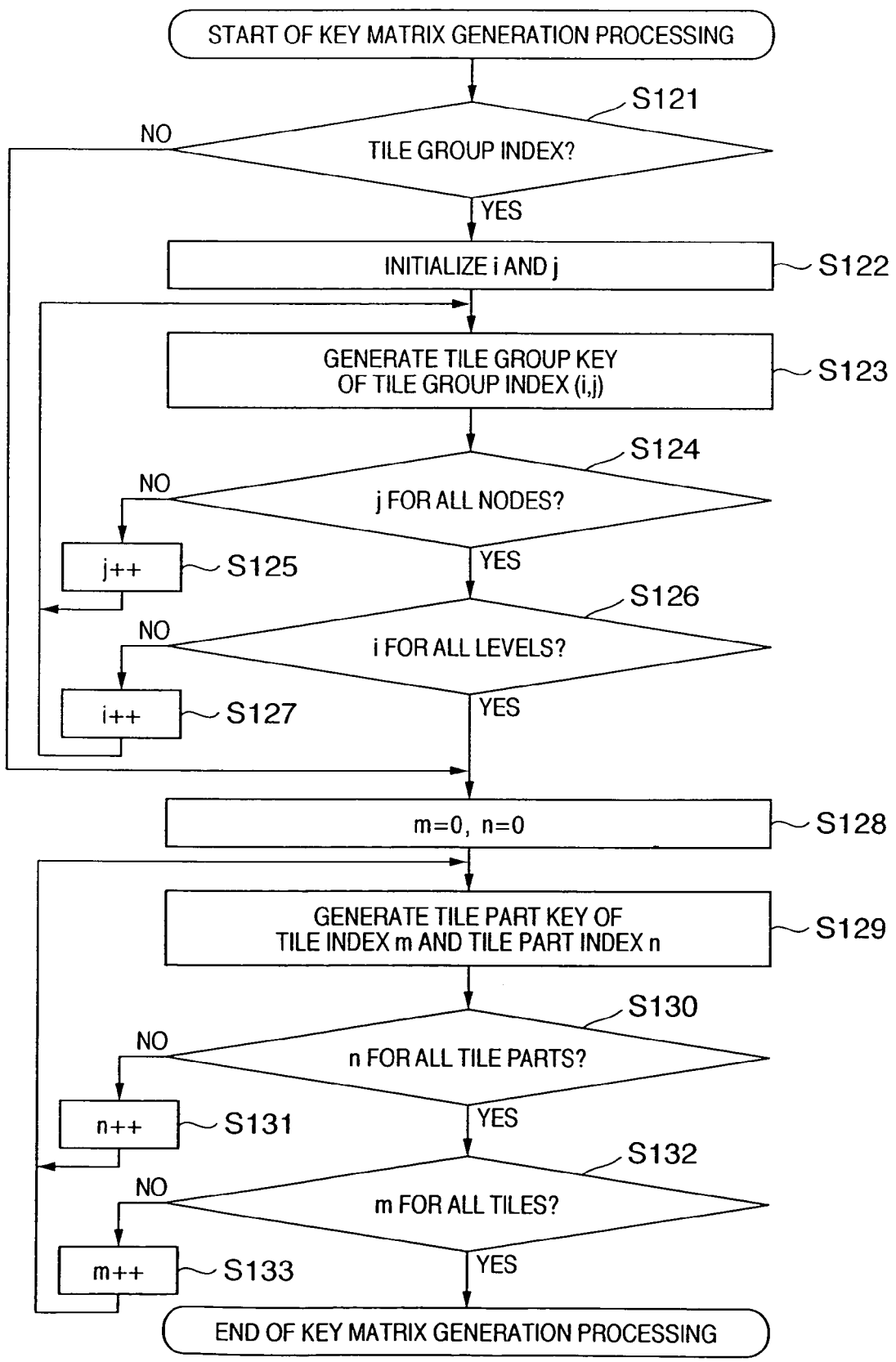
FIG. 12 is a flow chart for explaining key matrix generation processing according to the first embodiment.

The key matrix generation processing executed by the key matrix generation section 111 will be described here in detail with reference to FIG. 12. FIG. 12 is a flow chart showing the key matrix generation processing executed by the key matrix generation section 111.

First, in step S121, it is determined whether the received access key ak corresponds to a tile group or tile part. For this determination, the "information representing whether the index is a tile part index or tile group index" shown in FIG. 10 is used. When the determination result indicates a tile group index, the flow advances to step S122. When the determination result indicates a tile part index, the flow advances to step S128.

In step S122 (tile group index), the parameters i and j are initialized to the "index corresponding to the access key value" in the access key format shown in FIG. 10. The parameter i is an index that indicates a level in the above-described tree structure. The parameter j is an index representing a node at each level described above. That is, a combination of i and j (i,j) indicates a tile group index.

On the other hand, when it is determined that the index is a tile part index, and the flow advances to step S128, the parameters m and n are initialized to the "index corresponding to the access key value" in the access key format shown in FIG. 10. The parameter m is a tile index. The parameter n is a tile group index.

The remaining processes are the same as in the key generation processing shown in FIG. 6, and a detailed description thereof will be omitted.

As described above, the key matrix ka' is generated by the key matrix generation processing. The generated key matrix ka' is input to the decryption section 112.

The processing of the encryption tile part determination section 113 will be described next in detail. The encryption tile part determination section 113 receives the encrypted code stream c', extracts a tile part from the received code stream c', determines whether the extracted tile part is encrypted, and outputs encryption tile part information ta'.

The encryption tile part determination section 113 according to this embodiment interprets the tile part header field in the received code stream c' and checks whether the "information Inf representing that the tile part is encrypted" is recorded in the tile part field. The determined information is output as the encryption tile part information ta'. FIG. 13 shows an example of the encryption tile part information ta'.

FIG. 13 shows an example of the encryption tile part information ta' when the entire image is formed from 64 tiles, and the maximum number of tile parts is 5. As shown in FIG. 13, each row of the encryption tile part information ta' corresponds to a tile. Each column corresponds to a tile part. As for an element value of the matrix, "0" is recorded for a tile part which is not encrypted, "1" is recorded for an encrypted tile part, and "2" is recorded for a tile part that is not present.

The processing of the decryption section 112 will be described next in detail. The decryption section 112 receives the encrypted code stream c, the key matrix ka', and the encryption tile part information ta', decrypts a tile part of the code stream c' indicated by the encryption tile part information ta' by using a tile part key recorded in the key matrix ka', and outputs the decrypted code stream c".

The encryption tile part determination section 113 compares the encryption tile part information ta' with the key matrix ka'. For a tile part having an element value "1" in the encryption tile part matrix ta', the encryption tile part determination section 113 decrypts the tile part in the code stream c by using the key located at the same coordinates in the key matrix ka'. Each tile part in the code stream c' is replaced with a decrypted tile part.

For each decrypted tile part, the information Inf representing that the tile part is encrypted, which is recorded in the tile part header, is erased.

In addition, the header field is not decrypted, and only the data field is decrypted.

The decryption method must be a method corresponding to the method executed by the encryption processing section.

As described above, the encrypted code stream c' is decrypted in accordance with the access key, and the decrypted code stream is outputs as the decrypted code stream c".

Hence, even when the decryption processing section 143 shown in FIG. 14 receives and decrypts the encrypted code stream c' without receiving any access key ak from the access key generation section 142, decryption is successfully done only for unencrypted tile parts so that an image with a resolution that is allowed in advance can be reproduced. In other words, if the user of the decryption processing section 143 wants a clearer image, he/she acquires the access key ak and executes decryption processing again.

As described above, according to the first embodiment, even when image data having a plurality of tiles and layers is encrypted using different encryption keys for the respective tiles and layers, the plurality of keys need not be managed. In addition, the plurality of tiles and layers and decryption keys corresponding to them are recorded so that decryption processing can correctly be executed.

In the above embodiment, a tile part means a collective unit of frequency component regions generated when wavelet transform processing is executed. However, the present invention is not limited to this.

For example, in image compression-coding, generally, data obtained by frequency transform such as wavelet transform or orthogonal transform is quantized and encoded by entropy encoding. Several proposals have already been made in which encoding is executed for each plane per bit of each coefficient value obtained by quantization. The present invention may be applied to this method. This will be described in more detail with reference to FIG. 15.

Figure 15:
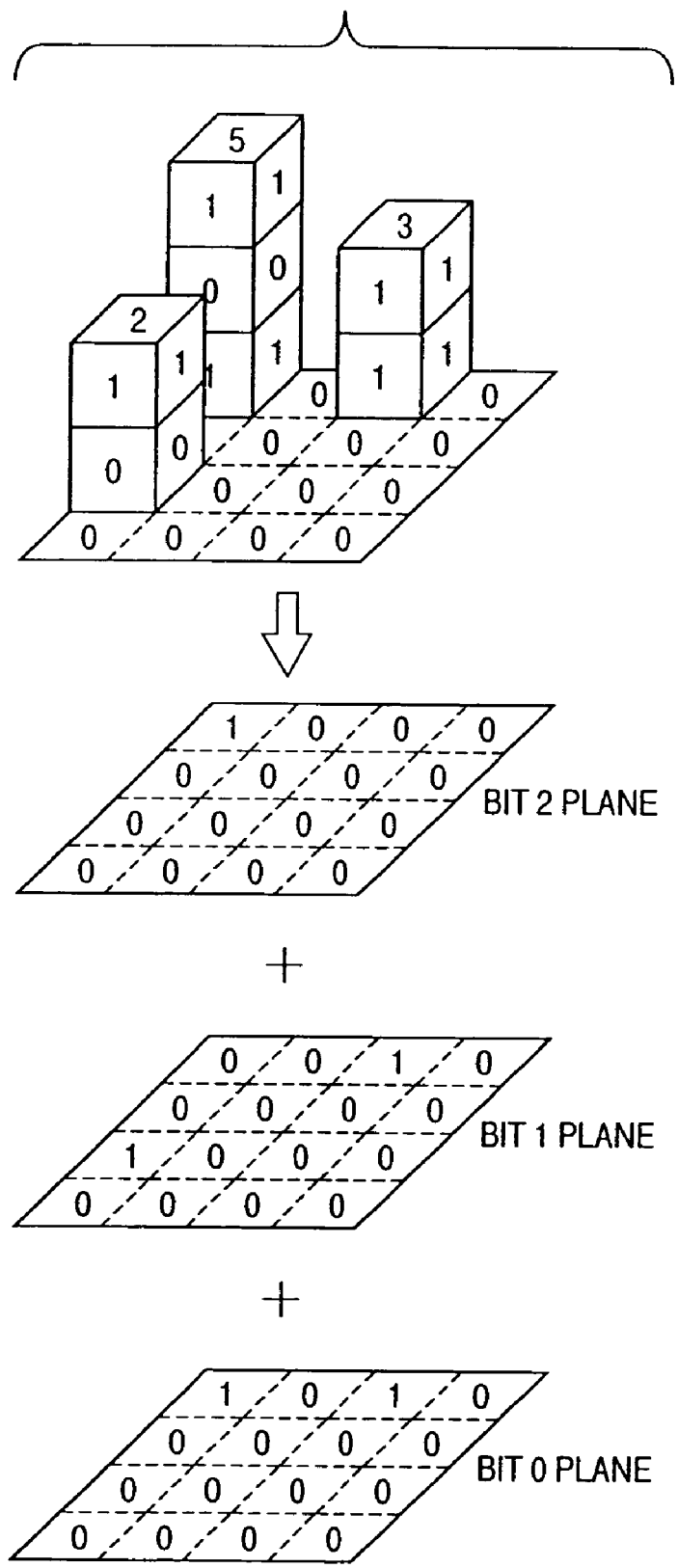
FIG. 15 is a view showing another form of tile parts.

FIG. 15 shows blocks of coefficient values after quantization. For the simplicity, 4×4 blocks are illustrated in FIG. 15. The number of blocks may be larger. Generally, the size becomes larger than this size. When coordinates are expressed by (i,j), the coefficient value is "5" for (1,1), "3" for (3,1), "2" for (1,3), and "0" for the remaining coordinates. The largest value is "5" which is expressed by a binary value "101". That is, in the example shown in FIG. 15, all coefficients can be expressed by 3 bits. For this reason, a bit 2 plane, bit 1 plane, and bit 0 plane suffice for expression. Hence, encoding is executed for each bit plane.

As for the degree of importance of data, a higher bit is more important. For this reason, planes of bit 2 are dominant for the image quality of the block. The influence on the image quality becomes larger in the order of the bit 1 plane and bit 0 plane. It simply means that when the above-described wavelet transform is executed a plurality of number of times, the coefficient value of the lowest frequency component (LL component) corresponds to a bit 2 plane, and the set {LH1+HL1+HH1} of the coefficients of the highest frequency components corresponds to a bit 0 plane.

The number of planes to be encoded is determined by the maximum value after frequency transform and quantization. Hence, the number of planes changes depending on the tile. Assume that quantization is executed using a fixed quantization step, and the value it can assume is 0 to 63, six planes (planes of bits 0 to 5) can be generated at maximum. Under these circumstances, in the example shown in FIG. 15, all coefficients can be expressed within 3 bits (bits 0 to 2), as it happened, and the planes of bits 3 to 5 need not be generated. That is, data for a bit plane that is not used may be absent, and "2" is stored in the above-described encryption tile part matrix shown in FIG. 8.

For a tile part, even when the number of bit planes used for encoding is assigned, and a small tile part index is assigned to the highest bit plane, the same effect as described above can be expected. Alternatively, a group of some bit planes used for encoding may be defined as a quality layer, and a small tile part index is assigned to the uppermost quality layer.

In encoding an image, each partial image (precinct) expressed by M×N pixels in the original image may be further segmented into some parts, and each segmented region may be defined as a tile part.

When an image formed from a plurality of components (luminance component and color components) is to be encoded, a predetermined component (e.g., the luminance value) may be defined as a tile part.

In short, in this embodiment, there are two methods of designating objects to be encrypted and executing encryption processing.

As the first method, when a given tile group is designated as an object to be encrypted, a tile group of lower level, which belongs to the designated tile group, and finally, all tiles belonging to the designated tile group are set as objects to be encrypted. Each tile data to be encrypted is encrypted by using a key derived from an encryption key generated for the tile group of root (level 0).

As a result, one encryption key suffices. In addition, tiles belonging to the desired tile group can be encrypted.

As the second method, when a given tile part is designated as an object to be encrypted, tile parts having indices equal to or more than the index of the designated tile part can be encrypted. In other words, tile parts having indices smaller than the index of the tile part designated as the object to be encrypted are not encrypted. For this reason, an image having a low resolution can unconditionally be reproduced. However, an image having a higher resolution cannot be encrypted without a decryption key.

Second Embodiment

In the first embodiment, the key matrix generation section 12 and encryption section 13 are separately provided in FIG. 1. The key matrix ka output from the key matrix generation section 12 is input to the encryption section 13. This also applies to the key matrix ka' in FIG. 11. The sizes of the key matrix ka and key matrix ka' are determined by the number of tiles that construct the image and the maximum value of tile parts. If the image has many tiles or the maximum value of tile parts is large, the sizes of the key matrix ka and key matrix ka' may become large.

However, the present invention is not limited to this. A key matrix generation section 12 and key matrix generation section 111 need not always output the key matrix ka and key matrix ka' for the entire image. Every time a key is generated, the generated key may be output to an encryption section 13 or decryption section 112. With this arrangement, the capacity of the memory necessary for keys can be decreased.

As described above, according to this embodiment, even when image data having a plurality of tiles and layers is encrypted using different encryption keys for the respective tiles and layers, the plurality of keys need not be managed. In addition, the plurality of tiles and layers and decryption keys corresponding to them are recorded so that decryption processing can correctly be executed.

Third Embodiment

In the first embodiment, equation (2) is used to generate tile group keys and tile keys. Equation (3) is used to generate tile part keys.

However, the present invention is not limited to this. Various kinds of processing can be executed to generate a key. For example, in step S63 shown in FIG. 6, a tile key may be calculated as the hash value of the tile key of the parent by $$K(j+1)=H(K(j)) \tag{2'}$$

where j is a tile index. In step S69 shown in FIG. 6, a tile part key may be calculated as the hash value of the tile key and tile part index by $$K(m,n)=H(K(m),n) \tag{3'}$$

where m is a tile index, and n is a tile part index.

Figure 16:
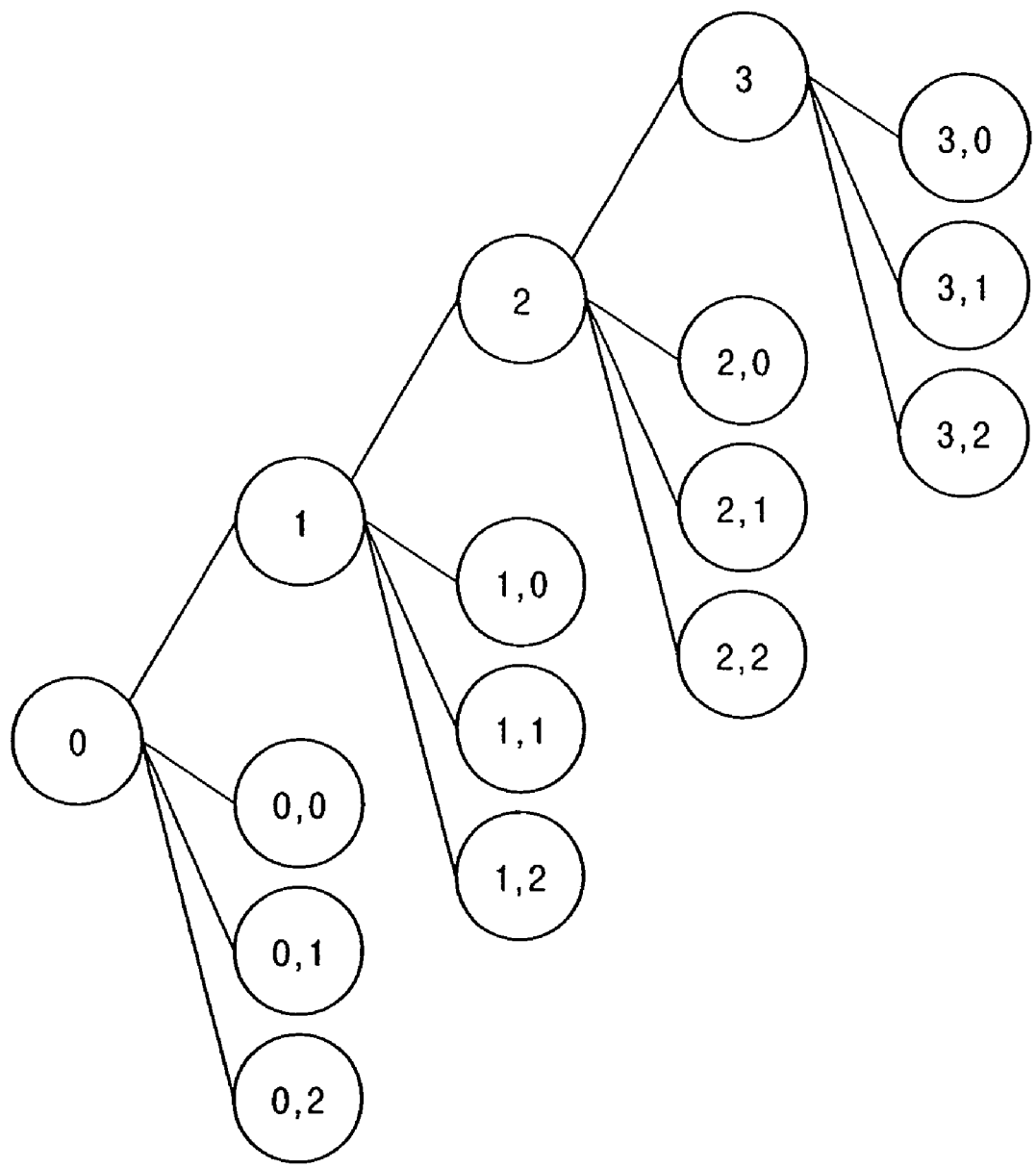
FIG. 16 is a view showing the tree structure of tile parts and tile groups according to the third embodiment.

FIG. 16 shows the tree structure of keys generated in this way. FIG. 16 is a view showing the tree structure of keys obtained by generating keys corresponding to the code stream c having tiles each comprising three tile parts by using equations (2') and (3').

With the above processing, the key for each tile can be generated by using only a hash function from the tile key corresponding to the parent node. For example, assume that access to tiles corresponding to tile index 2 and tile index 3 is permitted. In the first embodiment, the access key generation processing section must generate two tile keys corresponding to tile index 2 and tile index 3 and transmit the tile keys to the decryption section. In the third embodiment, however, the access key generation processing section generates only one tile key corresponding to tile index 2 and transmit the tile key to the decryption section. Hence, the efficiency can be increased.

In addition, a key for each tile part can be calculated using a hash function from a tile key corresponding to the parent node and the tile part index of the tile part. For example, in the first embodiment, it is difficult to permit access to only a tile part corresponding to tile part 1. This is because when access to tile part 1 is permitted, access to tile part 0 corresponding to the child node is also permitted. In the third embodiment, however, the tile part key corresponding to tile part 1 can be generated from the tile key corresponding to the parent node and tile part index 1. For this reason, more flexible access control can be realized.

The tile key may be generated in accordance with equation (2') in step S63 shown in FIG. 6, and the tile part key may be generated in accordance with equation (3) in step S69. Alternatively, the tile key may be generated in accordance with equation (2) in step S63, and the tile part key may be generated in accordance with equation (3') in step S69.

Fourth Embodiment

In the third embodiment, a tile part key is generated from a tile key corresponding to the parent node and a tile part index corresponding to the tile part. In the fourth embodiment, tile part keys are generated as a group.

Figure 17:
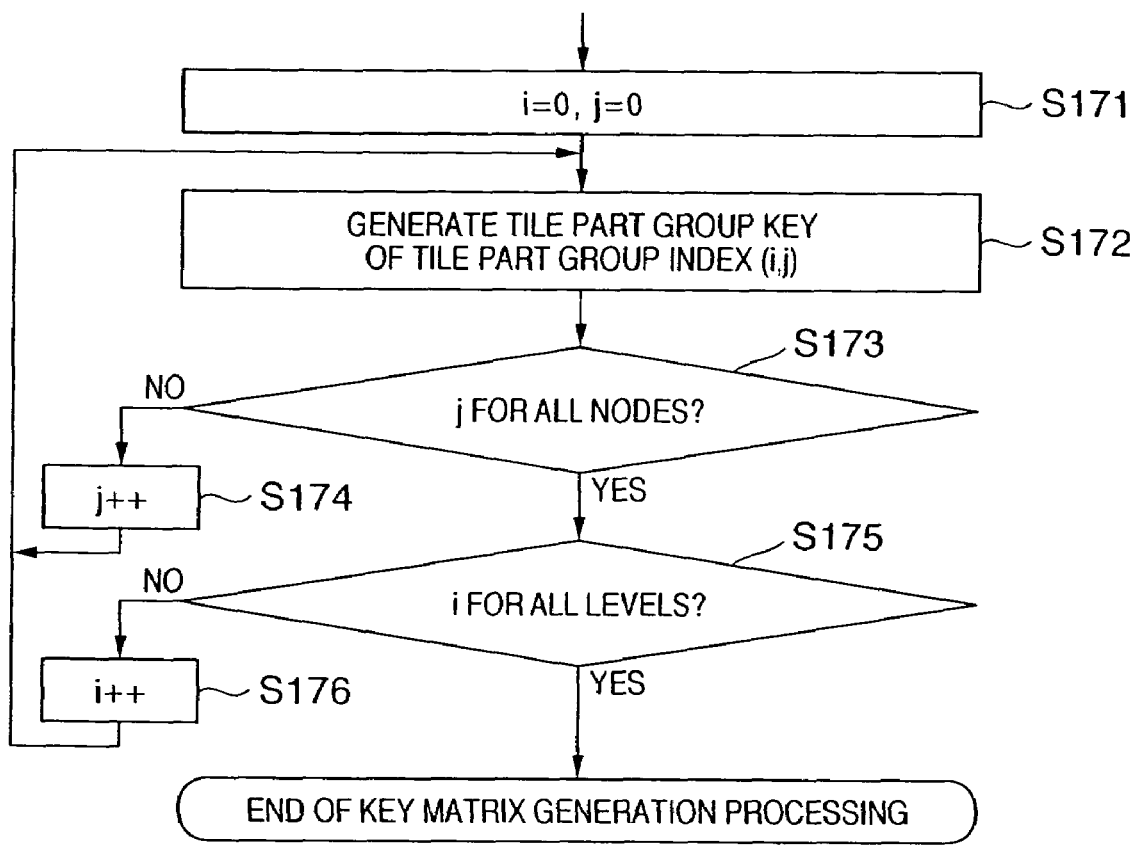
FIG. 17 is a flow chart showing part of processing according to the fourth embodiment.

Tile part key generation processing in this embodiment will be described with reference to FIG. 17. FIG. 17 is a flow chart for explaining tile part key generation processing according to this embodiment. The processing in steps S68 to S74 in the flow chart shown in FIG. 6 is replaced with processing shown in FIG. 17.

First, in step S171, parameters i and j are initialized to "0". The parameter i is an index that indicates a level in a tree structure. The parameter j is an index representing a node at each level. Especially, a combination of i and j (i,j) is called a tile part group index.

In step S172, the tile part group key of the tile part group index (i,j) is generated. The tile part group key is calculated as the hash value of the tile part group key of the parent and the tile part group index (i,j) by $$K(i,j)=H(K(i-1,k),i,j) \tag{4}$$

where k is an index that indicates a node corresponding to the parent node of the tile part group (i,j). More specifically, the tile part group key is generated from the tile part group key K(i−1,k) corresponding to the parent node and the tile part group index (i,j) of the node corresponding to the tile part group key to be generated. However, the present invention is not limited to this. The tile part group key may be generated from a key corresponding to the parent node and the tile part index contained in the node corresponding to the tile part group key to be generated.

For example, the tree is traced sequentially from the node corresponding to the tile part group to be generated, the node corresponding to the tile part is checked, and the tile part index of the tile part is used. In short, the key of a node of low level is derived on the basis of a key ck corresponding to the node of upper level (the node on the root node side) and the index of a node on the side of low level (lower layer). This processing is repeated.

Of the tile part group key generated using equation (4), the key located at the lowest level of child node is a tile part key. For a tile part key, the generated key is recorded in a key matrix ka.

In step S173, it is determined whether tile part group keys corresponding to all nodes at level i are generated. If YES in step S173, the flow advances to step S175. If NO in step S173, the flow advances to step S174.

In step S174, the parameter j is incremented by one. Then, step S172 is executed again. That is, keys are generated for all tile part groups belonging to the level indicated by the parameter i.

On the other hand, the tile part group keys for the level indicated by the parameter i are generated, the processing advances to step S175 to determine whether all levels are processed. If YES in step S175, the processing is ended. If NO in step S175, the flow advances to step S176. The parameter i is incremented by one to process the next level, and the processing from step S172 is repeated.

As described above, tile parts are put into a group, and a key matrix is generated. When access control for a plurality of tile parts is to be executed, the tile part group key is generated by the access key generation processing section. This realizes efficient access control.

Each of the encryption processing section 141, access key generation processing section 142, and decryption processing section 143 in the above-described embodiment can be implemented by an information processing apparatus such as a personal computer. The apparatus can be regarded as an invention of a method as procedures for implementing the functions. In addition, since each apparatus can be implemented by a computer, the present invention can be applied to a computer program executed in each apparatus or a computer-readable storage medium such as a CD-ROM which stores the computer program and can be read by the computer.

As has been described above, according to the present invention, even when image data having a plurality of tiles and layers is encrypted using different encryption keys for the respective tiles and layers, the plurality of keys need not be managed.

As many apparently widely different embodiments of the present invention can be made without departing from the spirit and scope thereof, it is to be understood that the invention is not limited to the specific embodiments thereof except as defined in the appended claims.

What is claimed is:

1. An information processing method of receiving image data compression-coded for each spatial rectangle region and encrypting the image data, comprising:
    repeatedly forming one spatial rectangle region group from a plurality of adjacent spatial rectangle regions in an image space and another spatial rectangle region group from adjacent spatial rectangle region groups so as to define a hierarchical structure of the spatial rectangle region groups;
    assigning identification information uniquely identifying each node to each node in the hierarchal structure;
    generating encryption key information of an uppermost layer for an entire image expressed by encoded data;
    executing, up to a node located at a terminal, processing for generating encryption key information for a node of interest on the basis of encryption key information generated for a node located at an upper layer in the hierarchical structure, the identification information assigned to the node of interest, and a one-way function, so as to generate encryption keys for each spatial rectangle region;
    designating a desired spatial rectangle region group in a desired layer as an object to be encrypted in a tree structure of the spatial rectangle region groups; and
    executing encryption processing for each spatial rectangle region, each of which is located at a lower layer belonging to the designated spatial rectangle region group, by using an encryption key generated for each spatial rectangle region.

2. The method according to claim 1, wherein the function ROM generates the key information by using coordinate position information of a spatial rectangle region group or a spatial rectangle region located at the lower layer.

3. The method according to claim 1, wherein the encryption key information of the uppermost layer is output to a predetermined authentication server on the Internet.

4. The method according to claim 1, wherein
    the method further comprises a step of displaying the received encoded data as a hierarchical structure of spatial rectangle regions and spatial rectangle region groups, and
    the desired spatial rectangle region group of the desired layer is designated from the hierarchical structure displayed in the display step.

5. An information processing apparatus for receiving image data compression-coded for each spatial rectangle region and encrypting the image data, comprising:
    means for repeatedly forming one spatial rectangle region group from a plurality of adjacent spatial rectangle regions in an image space and another spatial rectangle region group from adjacent spatial rectangle region groups so as to define a hierarchical structure of the special rectangle region groups;
    means for assigning identification information uniquely identifying each node to each node in the hierarchical structure;
    means for generating encryption key information of an uppermost layer for an entire image expressed by encoded data;
    means for executing, up to a node located at a terminal, processing for generating encryption key information for a node of interest on the basis of encryption key information generated for a node located at an upper layer in the hierarchical structure, the identification information assigned to the node of interest, and a one-way function, so as to generate encryption keys for each spatial rectangle region;
    means for designating a desired spatial rectangle region group in a desired layer as an object to be encrypted in a tree structure of the spatial rectangle region groups; and
    means for executing encryption processing for each spatial rectangle region, each of which is located at a lower layer belonging to the designated spatial rectangle region group, by using an encryption key generated for the spatial rectangle region,
    wherein at least one of said means is implemented using hardware.

6. An information processing method of receiving information containing encoded image data compression-coded for each spatial rectangle region which constitutes an image, said encoded image data containing both of encrypted and unencrypted spatial rectangle regions, and reproducing an image, comprising:
    repeatedly forming one spatial rectangle region group from a plurality of adjacent spatial rectangle regions in an image space and another spatial rectangle region group from adjacent spatial rectangle region groups on the basis of the received information so as to define a hierarchical structure of the spatial rectangle region groups;
    assigning identification information uniquely identifying each node to each node in the hierarchal structure;

receiving key information to be used to decrypt a desired spatial rectangle region group of an upper layer containing an encrypted spatial rectangle region;

executing, up to a node located at a terminal from a node corresponding to the received key information, processing for generating key information for a node of interest on the basis of the received or generated key information for a node located at an upper layer in the hierarchal structure, the identification information assigned to the node of interest, and a one-way function so as to generate the key information for each spatial rectangle region; and decrypting the encoded data of each encrypted spatial rectangle region by using the key information generated for each spatial rectangle region.

7. An information processing apparatus for receiving information containing encoded image data compression-coded for each spatial rectangle region which constitutes an image, said encoded image data containing both of encrypted and unencrypted spatial rectangle regions and reproducing an image comprising:

means for repeatedly forming one spatial rectangle region group from a plurality of adjacent spatial rectangle regions in an image space and another spatial rectangle region group from adjacent spatial rectangle region groups on the basis of the received information so as to define a hierarchical structure of the spatial rectangle region groups;

means for assigning identification information uniquely identifying each node to each node in the hierarchical structure;

means for receiving key information to be used to decrypt a desired spatial region group of an upper layer containing an encrypted spatial rectangle region;

means for executing, up to a node located at a terminal from a node corresponding to the received key information, processing for generating key information for a node of interest on the basis of the received or generated key information for a node located at an upper layer in the hierarchical structure, the identification information assigned to the node of interest, and a one-way function so as to generate key information for each spatial rectangle region; and means for decrypting the encoded data of each encrypted spatial tile region by using the key information generated for each spatial rectangle region, wherein at least one of said means is implemented using hardware.

8. A server which is connected to a network for providing a decryption key for an image containing encoded data of both encrypted and unencrypted spatial rectangle regions, comprising:

means for storing basic decryption key information and identification information, where the basic decryption key information corresponds to an uppermost layer of the image which has a hierarchical structure constructed by repeatedly forming one spatial rectangle region group from a plurality of adjacent spatial rectangle regions in an image space and another spatial rectangle region tile-group from adjacent spatial rectangle region groups, and where the identification information uniquely identifies each node in the hierarchical structure; and deriving, means for, when information that designates a spatial rectangle region group in a layer to be decrypted is received from a client on the network, sequentially deriving decryption key information for a node of interest from the basic decryption key or derived decryption key for a node at an upper layer in the hierarchical structure, the identification information of the node of interest, and a one-way function until reaching the designated spatial rectangle region group of the designated layer, and, when decryption key information for the designated spatial rectangle region group is generated, notifying the client of the decryption key information.

* * * * *

UNITED STATES PATENT AND TRADEMARK OFFICE
CERTIFICATE OF CORRECTION

PATENT NO. : 7,356,149 B2 Page 1 of 1
APPLICATION NO. : 10/686579
DATED : April 8, 2008
INVENTOR(S) : Junichi Hayashi It is certified that error appears in the above-identified patent and that said Letters Patent is hereby corrected as shown below:

Col. 7, line 16, "the" should read --be--.

Col. 18, line 4, "the function" should read --a function--; and line 56, "of" should be deleted.

Col. 19, line 19, "of" should be deleted.

Col. 20, line 21, "tile-" should be deleted.

Signed and Sealed this

Second Day of December, 2008

JON W. DUDAS
*Director of the United States Patent and Trademark Office*